March 22, 1932.  J. B. HENDERSON  1,850,982
GYROSCOPIC COMPASS
Filed June 2, 1921
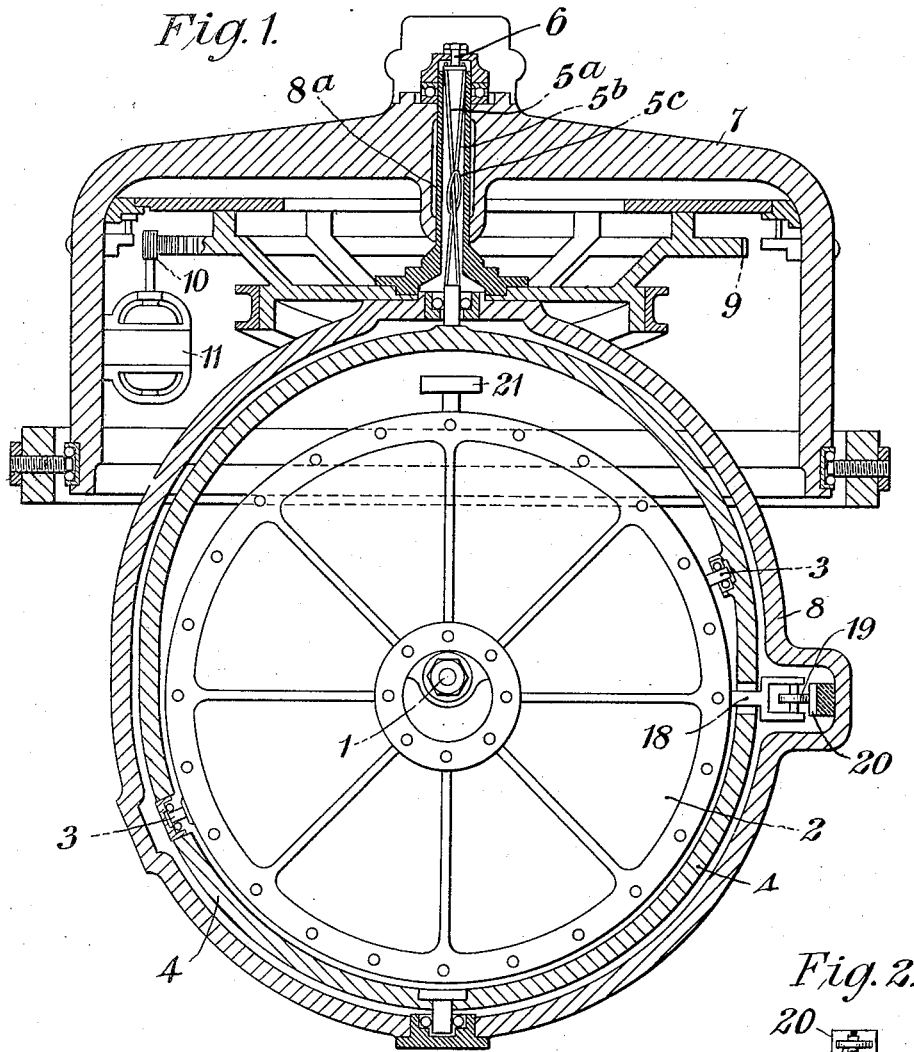
Fig.1.
Fig.2.
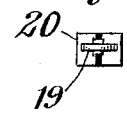
James B. Henderson INVENTOR.
BY Mahley and Gill
ATTORNEYS.

Patented Mar. 22, 1932

1,850,982

UNITED STATES PATENT OFFICE

JAMES BLACKLOCK HENDERSON, OF LEE, ENGLAND

GYROSCOPIC COMPASS

Application filed June 2, 1921, Serial No. 474,360, and in Great Britain November 13, 1913.

(GRANTED UNDER THE PROVISIONS OF THE ACT OF MARCH 3, 1921, 41 STAT. L., 1313)

The object of this invention is to improve gyrostatic compasses more especially with regard to the methods of suspension; the methods of damping the precessional movements when a displacement from the meridian occurs; and the prevention of deviation, due to rolling of the ship.

The gyro compass, as invented by Foucault, consists of a rotor with horizontal axis mounted in bearings in a case or ring which is pivotally supported on horizontal trunnions, the trunnion axis being a little above the centre of gravity of the rotor and casing so that it has gravitational stability on the trunnion axis, the position of stable equilibrium being that in which the rotor axis is approximately horizontal. The horizontal trunnion is carried by a vertical ring or frame which is supported on a wire suspension. Such a compass has no damping arrangement to bring it to the meridian when disturbed, but otherwise it would keep to the meridian when its axis is properly set on the meridian initially, a small elevation of the rotor axis being necessary. When used on a ship or other moving object the torsion head to which the upper end of the wire suspension is attached must be turned as the compass turns so that there will be no twist in the wire. This may be done electrically by means of a suitable following mechanism.

According to my invention in order to damp the precessional motion of the rotor axis and bring it back to the meridian when disturbed, I may twist the wire suspension through an angle proportional to the elevation of the rotor axis above or depression below the standard zero position on the meridian. This zero position can easily be brought into the horizontal plane by suitably loading the gyro casing so that it will be convenient in what follows to take the horizontal line in the meridian as the standard position of the axis. In order to give the suspension the required twist I may employ a reversible electric motor to twist the torsion head and connect the starting switch of the electric motor with the rotor casing. For example, a brush carried on the casing in line with the rotor axis may bear on a two-part commutator carried from the torsion head. When contact is made between the brush and one part the motor runs one way and when contact is made with the other part it runs in the opposite direction, thus causing the torsion head to follow the rotor axis. If now the insulation separating the two commutator segments is not vertical but is portion of a spiral round the vertical central axis of the gyroscope, the twist imparted to the wire will be proportional to the angular displacement of the axis of the rotor from the horizontal plane and I arrange the direction of twist so that the couple tends to bring the axis back to the horizontal plane.

Instead of using the suspension wire I may employ for this purpose a wire attached to the gimbal ring at the lower end of the vertical diameter.

Another method of damping I may sometimes employ is to arrange the trunnion axis inclined to the horizontal plane, but still in the plane of rotation of the rotor. This has the effect of imparting a twist to the wire suspension when the axis of the rotor is inclined.

Instead of using a single filar suspension I may employ a bi-filar or tri-filar suspension with a distance between the filars and I may introduce the electric current required to drive the rotor through the filars.

In the bi-filar arrangement the gimbal ring may be dispensed with and the filars may support the trunnion axis directly. If the two trunnions are fixed to the casing on different levels one above the centre of the rotor and the other below, the effect is the same as is produced by an inclined trunnion axis and damping is maintained. The large separation between the filars necessary to span the casing may introduce too great torsional stability, in which event I may employ a yoke between the filars above the rotor casing and arrange the filars closer together between the yoke and the torsion head. The advantage of this filar suspension is that the friction on the trunnion axis is reduced and is a more constant quantity than in the case of ball bearings. The filars may either be wrapped round the trunnions or clipped to them in any suitable manner.

In another arrangement I may load the rotor casing at the top so that it is in unstable equilibrium on the trunnion axis and support it from the trunnions on a crossed bi-filar suspension, one filar passing through a ring on the other, thereby producing a stable combination when the gyro is running. The damping is arranged as before by having the trunnions on different levels or by turning the torsion head or by other suitable means.

In order to make the period of oscillation of the gyro compass in the E. W. vertical plane as long as possible, I may employ two small gyroscopes fixed to the torsion head, the two axes of the rotors being in the E. W. direction and opposed and having the rotor casings pivotally mounted on vertical trunnions, the two casings being linked together by toothed wheels or otherwise so that they can only rotate round the trunnion axes in opposite directions and I constrain the motion round the trunnion axes by springs, the standard position of the gyros being that in which their axes of angular momenta are colinear and opposed.

Or, I may employ a single gyro on the torsion head with its axis vertical and mounted on a horizontal trunnion axis in the E. W. direction, the motion round the trunnion axis being constrained by springs. The pendular motion in the E. W. plane would then produce a pendular motion in the N. S. plane.

I may utilize this last arrangement of an auxiliary gyroscope for diminishing the deviation of the compass due to the ship rolling when on a quadrantal course; the rolling motion of the ship acting through the gyroscope will cause the compass also to partake of a motion equivalent to the ship pitching with the same period as she rolls. Since the effects of pitching and rolling in producing deviation cancel each other to some extent the deviation will be reduced.

A preferred embodiment of the invention is shown in the accompanying drawings in which Fig. 1 is a vertical sectional view; and Fig. 2 is a detail of the commutator. The gyroscope rotor is mounted to rotate on a horizontal shaft 1 within the casing 2 which is pivoted on a trunnion axis 3 which is inclined to the horizontal. The bearings which support the axis 3 are carried by a ring 4 which is suspended from a torsion head 6 by a crossed bifilar suspension 5a and 5b the filar 5a passing through the ring 5c interposed in the middle of 5b. The torsion head 6 is part of the following element 8 which is pivoted on the compass frame 7 on the vertical tubular axis 8a. The following element 8 carries the gear ring 9 with which meshes the pinion 10 on the spindle of the small reversible electric motor 11 carried by the frame 7. This motor is controlled by a contact roller 19 pivoted on a fork 18 attached to the gyro case and engaging with a two part commutator 20 fixed to the following element 8. According to whether the roller 19 makes contact with one or other segment of the commutator 20 the motor 11 is actuated in one or other direction so as to make the following element 8 keep in phase with the gyroscope case 2 in a manner well known in the art.

The gyroscope is put in unstable equilibrium about the axis 3 by means of a weight 21.

The gyroscope having been set up arbitrarily with its rotor axis horizontal and the rotor spinning, the rotor axis soon acquires a tilt due to the rotation of the earth and this tilt produces a torque about the horizontal axis perpendicular to the rotor axis, due to the weight 21 and a torque in the suspension due to the azimuthal displacement imparted to the ring 4 by the tilt of the rotor axis on account of the inclined trunnion axis 3. The torque due to the weight 21 produces a horizontal precession of the rotor axis, and the torque due to the suspension, a vertical precession of the rotor axis, and if the direction of rotation of the rotor in this new compass be the reverse of that used in the ordinary Foucault compass the equations of motion are identical with those of the latter and the gyroscope seeks the meridian.

It is essential for a stable combination that the torques due to the suspension shall be in the same direction as the precession due to the gravitational couple. The slope of the trunnion axis 3 and the direction of rotation must be related so that this condition is fulfilled: then the gyroscope, if set up in any azimuth will turn round in azimuth until it finally settles on the meridian with its rotor revolving clockwise as veiwed from the north, that is, with its rotation opposite to that of the earth. This requirement is satisfied by the inclination of axis 3 in Fig. 1 if the rotor is revolving clockwise in that figure, whereas if the rotor were revolving anti-clockwise or if the axis 3 were inclined in the opposite sense the torques in the suspension would tend to oppose the horizontal precession and the gyroscope would try to turn a half somersault on trunnions 3, and if the design of the frame permitted this somersault to take place without fouling, a Foucault compass would result.

It is to be clearly understood that if the direction of rotation of the rotor and the inclination of the trunnion axis 3 are fixed, the stable position of the compass is also fixed, being one or the other of two positions in both of which the rotor axis is on the meridian, but in one the gyroscope has turned over until the weight 21 is at the bottom and the gyroscope is rotating in the same sense as the earth whereas in the other the weight 21 is at the top as illustrated and the gyroscope is rotating in the opposite sense to the earth.

I claim:

1. In a gyro compass, a top heavy gyroscope, means for supporting the gyroscope including a crossed bi-filar suspension and a member within which the gyroscope is mounted upon an inclined axis and to which the suspension is attached.

2. In a gyro-compass, a top heavy gyroscope normally rotated in a counter-clockwise direction looking north, a member within which the gyroscope is mounted for oscillation about a trunnion axis, a supporting element and a connection between the element and the member including a crossed bifilar suspension.

3. In a gyro-compass, a top heavy gyroscope normally rotated in a counter-clockwise direction looking north, a member within which the gyroscope is mounted for oscillation about an inclined trunnion axis, a supporting element and a connection between the element and the member including a crossed bi-filar suspension.

4. In a gyro-compass, a gyroscope consisting of a rotor and a case, a member within which the case is supported on an axis inclined at an angle to the horizontal, a member within which the first member is supported for turning about a vertical axis, and means controlled by the angular position of the case about the inclined axis for applying a torque about the vertical axis.

In testimony whereof I affix my signature.

JAMES BLACKLOCK HENDERSON.